April 18, 1939.  S. Z. BONHAM  2,154,560
COMBINED CHUCK AND REAMER

Filed Oct. 15, 1936

Stephen Ziba Bonham
INVENTOR

BY Victor J. Evans & Co.
ATTORNEYS

Patented Apr. 18, 1939

2,154,560

UNITED STATES PATENT OFFICE 2,154,560

COMBINED CHUCK AND REAMER

Stephen Ziba Bonham, Kingston, Pa.

Application October 15, 1936, Serial No. 105,819

2 Claims. (Cl. 77—66)

My invention relates to improvements in combined chucks and reamers and the principal object thereof is to provide an efficient device of this character for holding a drill and forming a countersink in the work in conjunction with the drilling of a bore therein and which is particularly adapted for securely holding drills of various diameter therein for adjustment of the drills into various extended positions.

Another object is to provide a device of the character above set forth adapted for securely clamping drills of different sizes therein and limiting in different degree the depth of the reaming operation to be accomplished in connection with the drilling of bores of different diameters.

To the accomplishment of the above, and subordinate objects presently appearing, a preferred embodiment of my invention has been illustrated in the accompanying drawing, set forth in detail in the following description and defined in the claims appended hereto.

Figure 1:
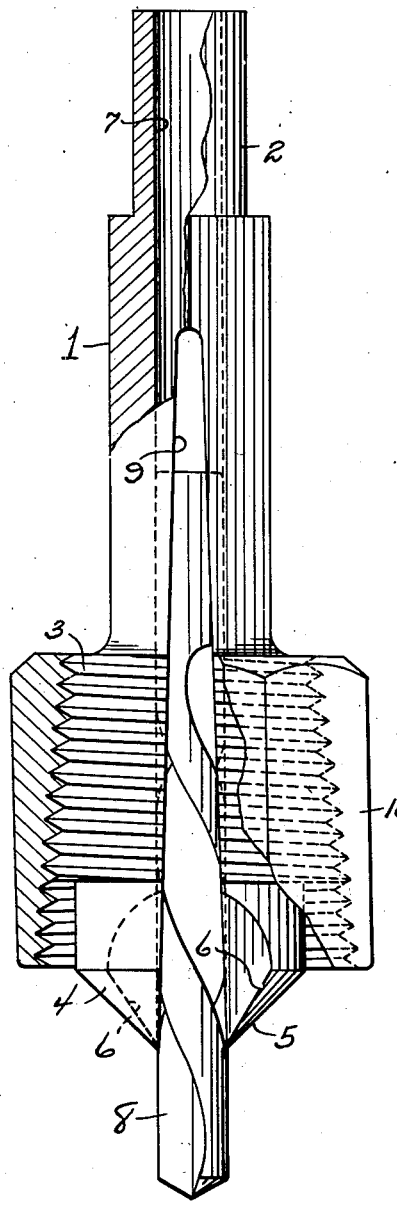
Figure 1 is a view partly in longitudinal section and partly in side elevation of the combined chuck and reamer of my invention.
Figure 2:
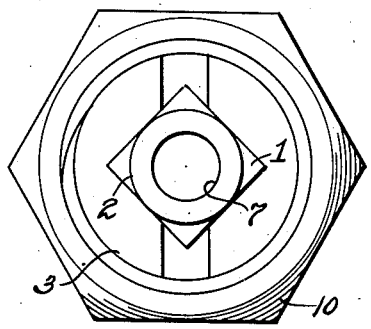
Figure 2 is a view in elevation looking at one end of the chuck.
Figure 3:
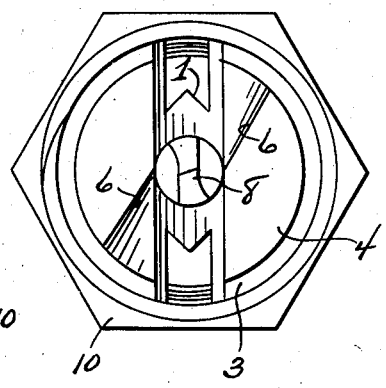
Figure 3 is a similar view looking at the opposite end thereof.

Referring to the drawing by numerals, my improved chuck and reamer comprises a tail stock 1, preferably square, having a reduced rear shank part 2, for mounting the device in a lathe or the like, and an enlarged inwardly tapered head part 3, exteriorly threaded, and a reamer, or countersink, part 4, extending forwardly from said head part and having a conical face 5 provided with suitable cutting edges 6. The above parts are formed of the usual tool steel or any other suitable metal. The shank part 2 may be round, as shown, or otherwise formed according to the character of the lathe head in which the chuck is to be mounted. The said parts are axially aligned and an axial bore 7 is formed therethrough for the insertion of a drill such as shown at 8. The stock, head and reamer parts are split centrally from side to side from the front face 5 of the reamer part to a point adjacent the shank end of the tail stock part, as at 9, so that these parts comprise opposed resilient clamping members for gripping the drill therebetween. The clamping action is effected by means of a nut 10 threaded onto the head part 3 for outward movement thereon to draw the clamping members into clamping relation. The nut 10 is designed to extend forwardly beyond the head part 3 and the face 5 of the reamer part 4 when a drill is clamped in position, so that said nut engages the work to fix the depth of the countersink to be reamed. As will be clear, the position of the nut 10 relative to the reamer part 4 will vary with drills of different diameters so that the depth of the countersink to be formed will be fixed in different degree for drills, or in other words, bores, of different diameters.

The foregoing description will, it is believed, suffice to impart a clear understanding of the details and operation of my improved chuck and reamer, together with the advantages thereof.

The details described are, however, to be understood as illustrative rather than restrictive and right is herein reserved to modifications of such details falling within the scope of the protection prayed.

What I claim is:

1. A combined drill chuck and reamer comprising, a tail stock part, an enlarged head part at one end thereof, tapering inwardly toward the tail stock end and exteriorly threaded, and a reamer part extending forwardly from the head part at the end opposite said tail stock, said parts being axially aligned and bored to receive drills of different sizes therebetween and split centrally from side to side from the outer face of the reamer part to a point adjacent the opposite end of the tail stock part to thereby provide opposed clamping members for gripping said drills therebetween, and a nut threaded on said head part for drawing said members into clamping relation to said drills and for movement forwardly beyond said head part at the end opposite said tail stock to different positions in inverse ratio to the diameters of the drills clamped by said members, whereby said nut is adapted to engage the work to limit in different degree the depth of the reaming operation in connection with the drilling of bores of different diameters.

2. A combined drill chuck and reamer comprising, a tail stock part, an enlarged head part at one end thereof, tapering inwardly toward the tail stock end and exteriorly threaded, and a reamer part extending forwardly at the end opposite said tail stock from said head part, said parts being axially aligned and bored to receive a drill therein and split centrally from side to side from the outer end of the reamer part to a point adjacent the opposite end of the tail stock part to thereby provide opposed clamping members for gripping said drill therebetween, and means threaded on the head part for drawing said members into clamping relation to the drill and movable forwardly beyond the head part at the end opposite said tail stock distances in inverse ratio to the diameters of the drills clamped by said members to engage the work to limit the depth of the countersink.

STEPHEN ZIBA BONHAM.